United States Patent
Iyer

(10) Patent No.: US 7,031,373 B1
(45) Date of Patent: Apr. 18, 2006

(54) APPARATUS FOR CONTROLLING A PLURALITY OF RECEIVER FINGERS IN A CDMA RECEIVER

(75) Inventor: Ravi K. Iyer, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 761 days.

(21) Appl. No.: 09/638,604

(22) Filed: Aug. 15, 2000

(51) Int. Cl.
H04B 1/69 (2006.01)
H04B 1/713 (2006.01)

(52) U.S. Cl. .................. 375/148; 375/149; 375/150

(58) Field of Classification Search ........... 375/148, 375/130, 133, 136, 141, 147, 149, 150, 259, 375/279, 280; 370/332, 333, 335, 341, 342, 370/320; 386/46; 725/2, 100, 110, 131, 725/151, 120; 455/439, 436
See application file for complete search history.

(56) References Cited

U.S. PATENT DOCUMENTS

| 5,455,821 | A | * | 10/1995 | Schaeffer et al. | 370/332 |
| 5,490,204 | A | * | 2/1996 | Gulledge | 455/423 |
| 5,504,939 | A | * | 4/1996 | Mayrand et al. | 455/450 |
| 5,764,687 | A | * | 6/1998 | Easton | 375/147 |
| 5,903,554 | A | * | 5/1999 | Saints | 370/342 |
| 6,157,687 | A | * | 12/2000 | Ono | 375/347 |
| 6,233,456 | B1 | * | 5/2001 | Schiff et al. | 455/439 |
| 6,269,075 | B1 | * | 7/2001 | Tran | 370/206 |
| 6,445,908 | B1 | * | 9/2002 | Glazko | 455/255 |
| 6,515,980 | B1 | * | 2/2003 | Bottomley | 370/342 |
| 6,570,918 | B1 | * | 5/2003 | Rademacher | 375/232 |
| 6,795,411 | B1 | * | 9/2004 | Dino et al. | 370/329 |

* cited by examiner

Primary Examiner—Jean Corrielus
Assistant Examiner—Qutub Ghulamali

(57) ABSTRACT

A method and apparatus controls a plurality of receiver channel elements (102a–102n), such as RAKE receiver fingers in a CDMA receiver, by assigning a real time priority metric to each channel type. For example, a receiver channel element management module (109) generates a channel weight value (216) and a receiver channel element factor value (218). The channel weight value (216) is dynamically determined on a per channel type basis representing an extent of energy demanded by a channel. For example, a channel at a higher rate may be programmed to start off with higher energy needs as compared to a different channel type, such as a voice channel which may communicate information at a lower rate. The receiver channel element factor value (218) is used to determine an impact of deassigning receiver fingers so that the dropped receiver finger is the one that is least harmful to all channels.

15 Claims, 4 Drawing Sheets

APPARATUS FOR CONTROLLING A PLURALITY OF RECEIVER FINGERS IN A CDMA RECEIVER

FIELD OF THE INVENTION

The invention relates generally to CDMA receivers and methods for controlling multiple receiver fingers, and more particularly to CDMA receivers in a wireless communication system that have a plurality of receiver fingers for receiving a plurality of different channel types.

BACKGROUND OF THE INVENTION

Wireless spread spectrum communication systems are well known. For example, in single channel spread spectrum systems, a mobile station, such as a handheld telephone, Internet appliance, laptop computer or any other suitable device may communicate with one or more base stations over a wireless air interface. Typically, a mobile station is tuned to a single channel, such as a channel that communicates voice information. Multiple mobile stations may be tuned to the same frequency but may be assigned different spreading codes, can be differentiated by time (PN offset) or other suitable differentiation criteria. A receiver, that may be in a base station or in a mobile station, typically includes a plurality of receiver channel elements, such as a plurality of RAKE receiver fingers. Each finger of a RAKE receiver is typically assigned to a different traffic channel (e.g., spreading code). A searcher typically searches a pilot channel for energy peaks to provide receiver channel element management, also known as finger management. For example, the IS95 standard known as TIA/EIA-95-B Mobile Station-Base Station Compatibility Standard for Dual-Mode Spread Spectrum Systems. utilizes pilot power that is detected by a searcher to assign different fingers to receive information during different timing windows. If pilot energy is strong enough, it is assumed that the associated traffic channel is also strong enough. Once suitably adjusted, the energy received by each of the rake fingers is suitably combined and passed to a digital demodulator, such as a Viterbi decoder. Such conventional finger management systems typically use the pilot energy per chip (Ec) per incident noise power (Io) to determine whether the searcher has detected a suitable energy peak at a particular point in time. Accordingly, the searcher provides the peak pilot energy metrics to a finger management algorithm which then provides a receiver finger control signal to adjust a receiver finger to center about a selected window in time. If the searcher determines that the pilot energies are above an allowable threshold, then the finger management system determines if a receiver finger should be assigned to the requisite path or channel. Commonly, each receiver finger is assigned to a base station. Each base station typically has one or more different assigned Walsh codes for forward link (base-to-mobile) transmissions. Also, searches keep a list of multi-paths for a channel to provide diversity reception.

A problem arises in systems with multiple simultaneous communication link capabilities such as that described in 3GPP2 C.S0002-A (CDMA 2000 System) where a mobile station may be receiving multiple channels wherein each of the channels requires a different quality of service using differing size Walsh codes. For example, a mobile unit may simultaneously require a voice channel at one rate and a data channel at a different rate to provide differing services for a user. Accordingly, a mobile station is forced to manage the radio frequency environment for each channel or service while maintaining a radio frequency link performance that is appropriate for each type of channel. Optimization of received channel energy becomes increasingly important as additional channels are required. If a user requires both a voice channel and one or more data channels at the same time, and all of the strongest received channels are voices, the user may be prevented from obtaining access to a data channel since the pilot energies for voice channels may be the highest. Where a BTS is loaded so that all data channels, for example, are already in use, even low energy data multi-path signals may be valuable for a mobile station to be able to combine with other multi-paths.

Also, unlike single channel systems, multi-channel type systems may have a varying ratio of pilot energy to traffic channel energy since they may use a closed loop transmit power control scheme. The downlink (or uplink) power can be adjusted hundreds of times per second. Accordingly, pilot energy measurements may no longer be an accurate representation of traffic channel energies due to the rapid energy changes induced by fast closed loop power control. For example, a mobile station may send a transmit power control command to a base station every 1.25 milliseconds, thereby requiring a base station, for example, to increase to decrease power of a particular channel very often. In addition, multiple channels are simultaneously active by a mobile so that multiple voice channels may be operational as well as multiple data channels. In addition, multi-channel spread spectrum systems allow the higher rate channels, such as data channels, to be turned on and off during a call. Accordingly, traffic channel energies can vary drastically on a per user basis. A mobile station may be assigned multiple codes or different length codes, so that multiple channels need to be suitably received by a plurality of receiver channel elements, such as RAKE receiver fingers. Accordingly, in multiple channel systems, both a mobile station and a base station can create transmit control information such as power control bits (PCB's) and tell each other to increase or decrease traffic channel power on a very rapid basis. Therefore, total pilot energy may not be a sufficient indicator of traffic channel energy. With more channels operating simultaneously in the rapidly changing channel power and different channel rates, determining receiver finger assignments can be quite difficult. Frequent messaging and increasing and decreasing of BTS transmit powers can necessarily increase the load on the BTS and can reduce system capacity.

In CDMA 2000 type wireless systems, time diversity over multiple receiver fingers is accompanied with a variety of different channel types served by the receiver fingers. For example, one channel type may be dedicated at a different rate for voice than for data communication. Accordingly, it is important to distinguish receiver finger performance for channels providing different qualities of service. Where there are constrained receiver resources, there may be fewer assignable fingers compared to the number of multi-path candidates. Accordingly, assigning and deassigning receiver fingers becomes an important aspect in providing improved quality of communication.

Consequently, a need exists for an improved CDMA receiver and method for managing receiver finger assignments and deassignments in systems that employ different channel types, such as channels operating at different rates.

DETAILED DESCRIPTION OF THE PREFERRED EMBODIMENT

Briefly, a method and apparatus controls a plurality of receiver channel elements, such as RAKE receiver fingers in a CDMA receiver, by assigning a real time priority metric to each channel type. For example, a channel weight value is dynamically determined on a per channel type basis representing an extent of energy demanded by a channel. For example, a channel at a higher rate may be programmed to start off with higher energy needs as compared to a different channel type, such as a voice channel which may communicate information at a lower rate. Receiver channel element usage is more judicious to improve quality of service levels so that the power up requests between a BTS and mobile unit can be less frequent. The disclosed method and apparatus adds and drops receiver fingers based on weighing the importance of channels and based on the impact of deassigning receiver fingers so that the dropped receiver finger is the one that is the least harmful to all channels.

In one embodiment, a method and apparatus determines the channel weight value on a per channel type basis based on at least a bench weight value and a current channel error value. A receive channel element factor value, representing a performance valuation metric for a receiver channel element, is determined based on the determined channel weight value irrespective of channel pilot measurements. The method and apparatus also determines a suitable receiver channel element assignment based on the finger factor value. For example, when adding a receiver channel element to a combiner, more receiver channel elements are not added for a channel that is already strong enough. Rather, receiver channel elements are used judiciously to acquire multi-paths for weaker channels. When dropping or deassigning receiver channel elements, a discrimination is made among receiver channel elements on the grounds of their importance to channels that need more energy, rather than individual pilot energies.

Figure 1:
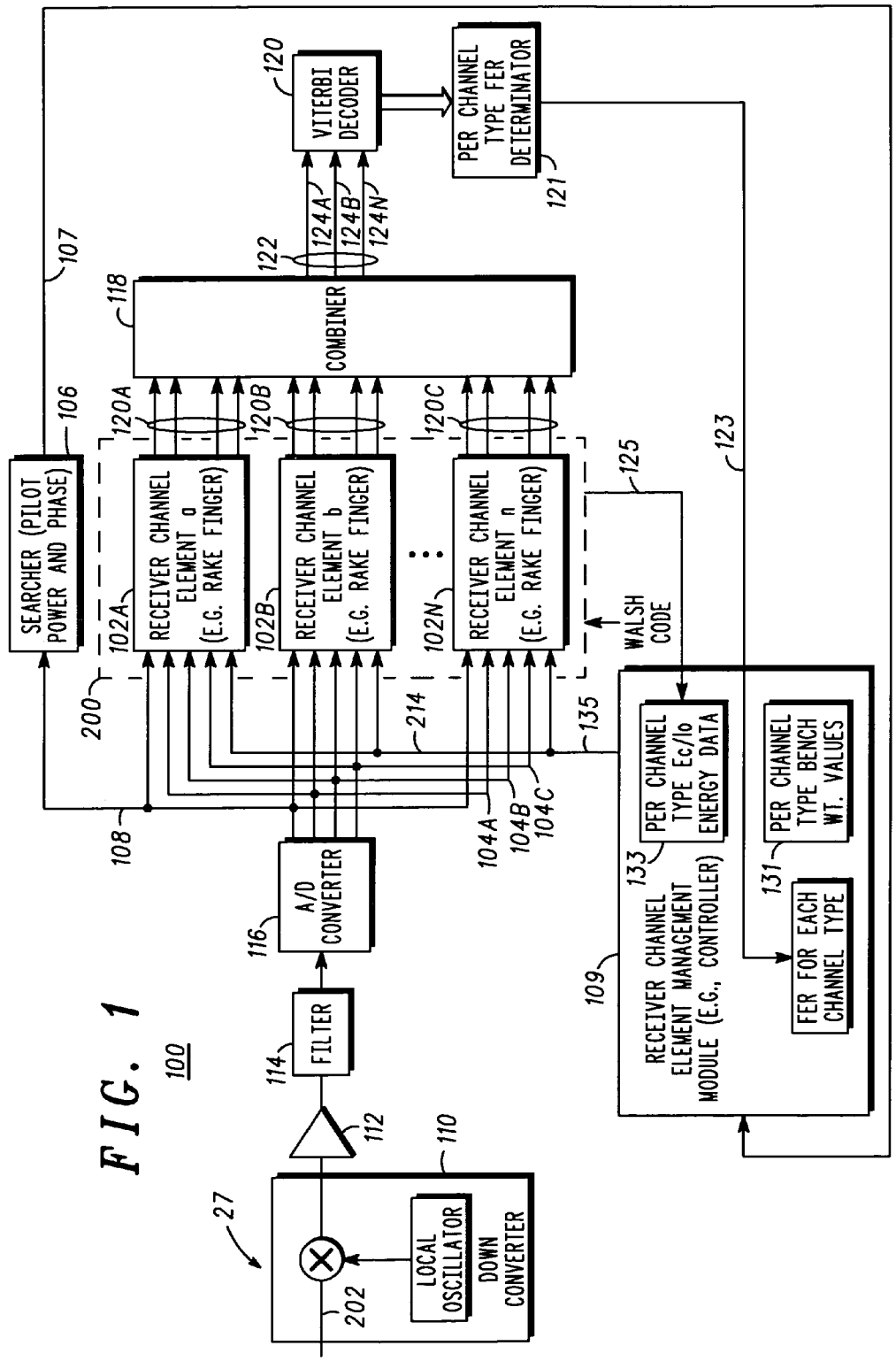
FIG. 1 is a block diagram illustrating one example of a wireless CDMA receiver in accordance with one embodiment of the invention.

FIG. 1 shows one example of a wireless receiver 100 in accordance with one embodiment of the invention. The wireless receiver 100 includes a plurality of receiver channel elements 102a–102n that are each operative to receive spread spectrum signals 104a–104c that represent different channel types. For example, one channel type may be a dedicated control channel 104a, other channel types may include one or more traffic channels, such as a voice channel 104b, a supplemental channel, such as a data channel 104c, and any other suitable channels as desired. The spread spectrum signals 104–104c may be transmitted, for example, by a plurality of base stations (or a single base station) such that each receiver channel element 102a–102n is dedicated, for example, for a specific base station. However, any suitable assignment may also be used. The wireless receiver 100 may also include a searcher 106 operative to search for energy peaks within a pilot signal 108, as known in the art, to obtain a pilot signal energy profile indicating energy levels and phase information. The searcher 106 measures the pilot energy 107 to initially assign receiver channel elements to received channels, as known in the art. The searcher 106 measures the pilot energy 107, such as represented as Ec/Io, to obtain the pilot energy per time profile, as known in the art. This may provide, for example, an energy per chip indication. The searcher 106 is operative to determine pilot signal phase information, such as pilot energy information 107 and a receiver element sample window to initially assign the receiver channel elements 102–102n to receive a different signal, or a window based on the receiver element sample window. Once initial receiver channel elements, such as RAKE receiver fingers, are initially assigned, the receiver channel element management module 109 controls receiver channel element assignment and deassignment dynamically to obtain suitable multi-paths.

At least a first channel of all channels that a receiver channel element receives may be associated with a first time window of acquisition. At least a second channel that the receiver channel element receives may be associated with the same time window of acquisition. This may be desirable where a receiver element is assigned to a multipath component of a spread spectrum signal. The multipath component is another image of the transmitted signal, delayed by channel propagation. Multipath components can be used in spread spectrum systems to provide an additional un-correlated source of information.

As shown, the wireless receiver 100 may also include, as known in the art, a suitable down converter 110, a gain stage 112, a suitable filter stage 114, and an analog to digital conversion stage 116 as known in the art to process received CDMA signals. The wireless receiver 100 also includes a combiner 118, digital demodulator 120, such as a Viterbi decoder, and a current channel error value determinator 121. The current channel error value determinator 121, such as a per channel type frame error rate determinator generates current channel error values 123 indicating the frame error rate, for example, for each channel type (i.e., each traffic channel). This may be performed via a suitable software algorithm, as known in the art.

Each of the receiver channel elements 102a–102n provides channel type energy values 125 such as Ec/Io measurements for each received channel type, as known in the art. For examples, the RAKE fingers output this information periodically to registers. These registers can be read whenever the values are required.

The plurality of receiver channel elements 102a–102n receive the multi-channel spread spectrum signal 127 which includes the plurality of channels 104a–104c from each base station, for example. The plurality of multi-channel spread spectrum signals may include different rate spread spectrum information. For example, the fundamental channel 104b may require information at a rate suitable for voice communication whereas the supplemental channel 104c may provide information sent at a higher rate for data transfer. In addition, the received signal information 120–102n includes correlated samples as known in the art.

The combiner 118, which may be a hardware or software combiner, suitably combines the output from the various receiver channel elements to provide combined sample outputs per channel at a symbol rate represented as information 122 for the Viterbi decoder 120. The Viterbi decoder 120, as known in the art, outputs bits per channel for each of the channels 124a–124n. As described herein, the combiner 118 combines multi-paths to provide a higher energy signal to improve frame error rates.

The receiver channel element management module 109 may be a suitable software algorithm executed by a processing device such as DSP, microprocessor or any other suitable device, a hardware logic circuit, or any suitable combination of hardware and software. In one embodiment, the module 109 includes memory that contains per channel type bench weight values 131 and also includes memory that stores the channel type energy values 125 in, for example, a table format as indicated as per channel type energy (Ec/Io) data 133. The receiver channel element management module 109 generates receiver channel element control information 135 to control assignment and deassignment of receiver channel elements based on a calculated channel element factor value. The receiver channel element management module 109 is operatively coupled to the plurality of receiver channel elements 102a–102n to control assignment and deassignment of the receiver channel elements.

The receiver channel element management module 109 uses channel energies (not pixel energies) such as the channel type energy values 125 to determine channel performance and uses the channel energies as part of the basis for RAKE receiver finger management. The receiver channel element management module 109 also uses quality of service data such as the current channel error value 123 as feedback to improve receiver finger management.

Figure 2:
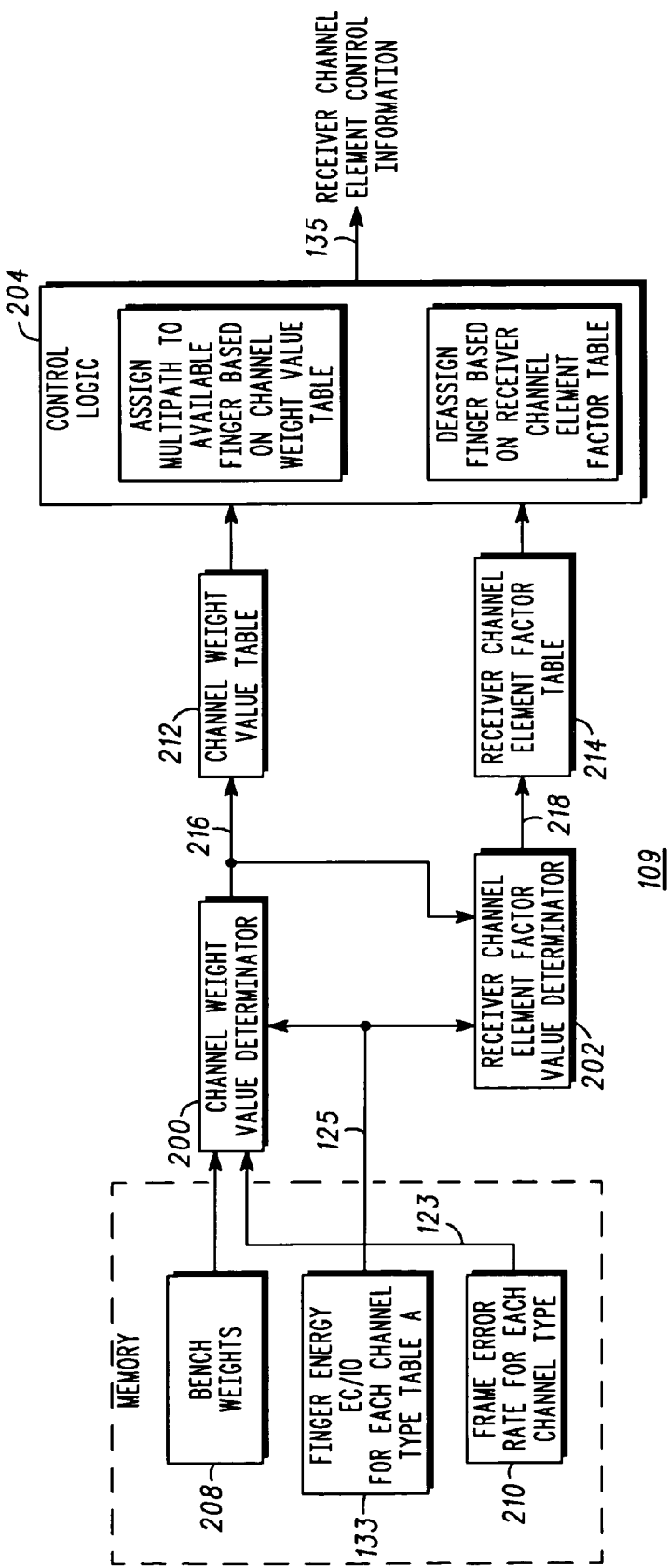
FIG. 2 is block diagram illustrating one example of the operation of a receiver channel element management module in accordance with one embodiment of the invention.
Figure 5:
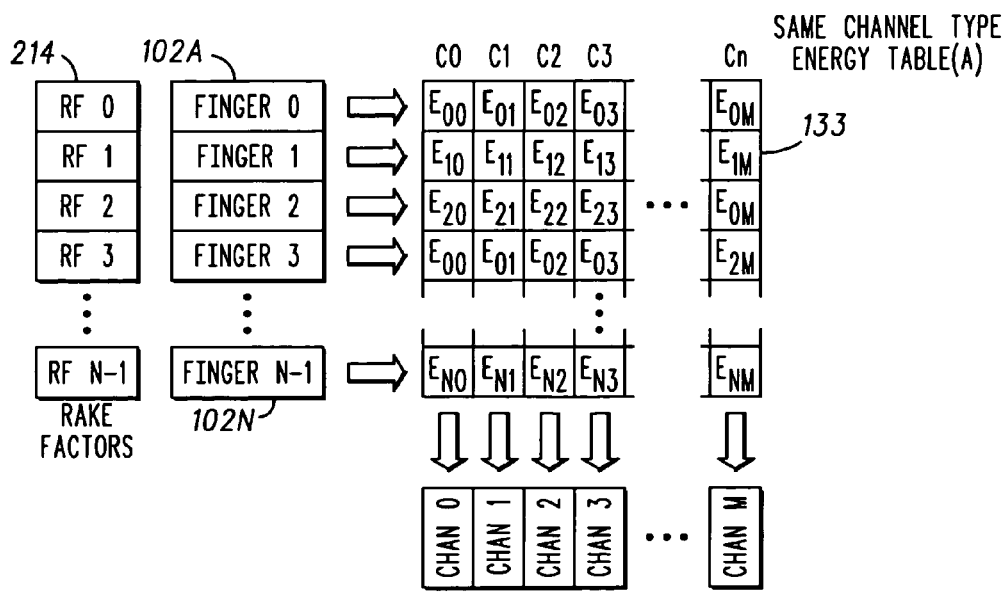
FIG. 5 is a graphical representation of one example of a RAKE factor table, a channel energy table, and a channel weight table in accordance with one embodiment of the invention.

Referring to FIGS. 1, 2 and 5, the receiver channel element management module 109 includes a channel weight value determinator 200, a receiver channel element factor value determinator 202, control logic 204 and associated memory 206. Memory 206 contains preset bench weight values 208 for each channel type. The bench weights may be set a priori so that, for example, data channel types have a higher bench weight than voice channels. In addition, memory 206 includes the per channel type energy data 133 along with stored channel error values 210 for each channel type. The memory 206 may also include the channel weight table 212 containing a channel weight value for each of the plurality of channel types on a per channel basis. Memory 206 may also include receiver channel element factor table 214 containing a receiver channel element factor value for each of the plurality of receiver channel elements.

The receiver channel element management module 109 produces several metrics. The channel weight value determinator 200 generates channel weight values (Wc) 216 on a per channel type basis. Each of the channel weight value (Wc) 216 represent an extent of energy demanded by the channel. The channel weight value determinator 200 determines the channel weight value 216 based on the following formula (Equation 1):

$$Wc = \frac{(\text{Bench\_wt}) - (\text{current\_channel\_error\_value})}{\text{Base\_value} + \displaystyle\sum_{\text{all\_fingers}} \text{energy\_from\_allchannelsfor\_given\_channel\_type}}$$

Wherein the base_value (i.e. energy) is precalculated for each channel and is used to prevent Wc from going out of bounds when energy_from_all_channels_for_given_channel type is very low. This base_value may be determined by trial and error based on modeling of the system to change the range for Wc as desired. The current_channel_error_value is the current channel error rate (good frames/bad frames) multiplied by a scale value (energy). The scale value is computed based on the bench weight (to have the same order of magnitude as the bench weight) and based on the desired sensitivity to frame error rate. For example, if the bench weight is in the range of 1–10 and it is desired that the FER has a large impact on the Wc, and assuming there is a frame error rate of 5%, the scale value may be set at 20.

The receiver channel element factor value determinator 202 is operative to determine another metric, namely the finger factor value 218. The finger factor value 218 is based on the channel weight value 216. The finger factor value 218 represents a performance valuation metric for a receiver channel element. The finger factor value determinator 202 determines the finger factor value 218 based on the following formula (Equation 2):

$$\text{Fingerfactor\_value} = \frac{\displaystyle\sum_{\text{all\_channels}} (\text{energy\_to\_one\_channel})(\text{thatchannel\_Wc})}{\displaystyle\sum_{\text{all\_channels}} Wc}.$$

The receiver channel element management module 109 stores the generated channel weight values 216 and finger factor values 218 in respective tables 212 and 214.

The control logic 204 determines whether a receiver channel element 102a–102n should be assigned or deassigned based on the channel weight value table 212 and the receiver channel element factor table 214. For example, the receiver channel element management module 109 deassigns a receiver channel element 102a–102n based on the receiver channel element factor value by dropping the receiving channel element having the lowest receiver channel element factor value. The receiver channel element management module 109 assigns a receiver channel element having a highest channel weight value to receive a multipath signal. It will be recognized that the control logic 204 may be suitably implemented via a software algorithm, hardware, or any suitable combination thereof. Likewise, the channel weight value determinator 200 can be implemented as a suitable software algorithm, hardware, or any suitable combination thereof. In addition, the receiver channel element factor value determinator 202 may be implemented as a software algorithm, hardware, or any suitable combination thereof.

Each finger has a receiver channel element factor value (RFI). Each channel has a channel weight value 216 (Wc). Referring again to FIG. 5, the channel type energy table 133 can be used to generate the total energy output for a particular channel as received by the receiver. For example, summing along columns gives total energy output on a per channel basis represented as:

$$f \sum_{i=0}^{N-1} E_{ic}$$

is the total energy for the $c^{th}$ channel from the N fingers.

Figure 3:
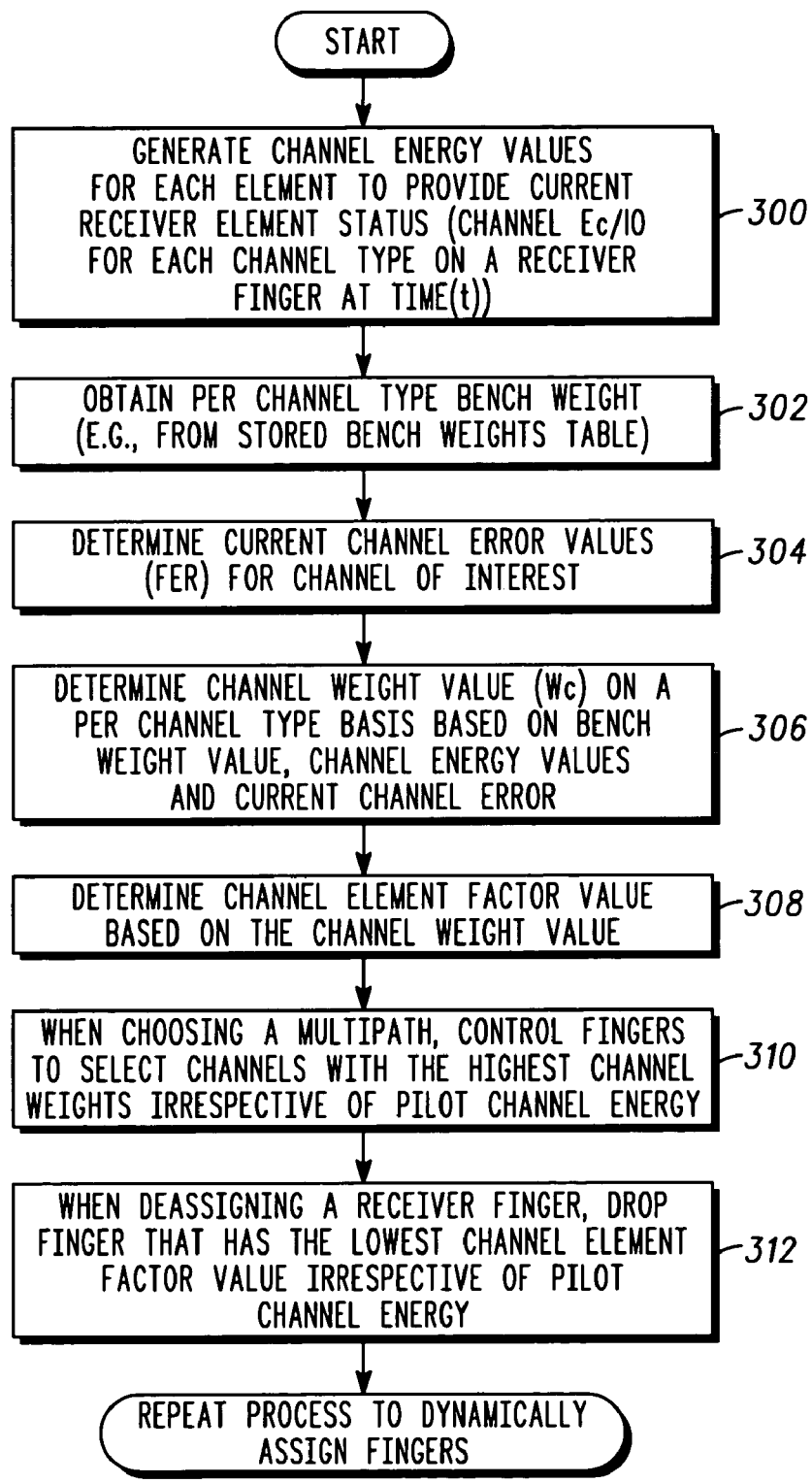
FIG. 3 is a flow chart illustrating one example of a method for controlling a plurality of receiver fingers in a CDMA receiver in accordance with one embodiment of the invention.

FIG. 3 illustrates one example of a method for controlling receiver channel elements. As shown in block 300, the method includes generating channel energy values 125 for each receiver channel element 102a–102n to provide current receiver channel element status. For example, the method includes generating channel energies in the form of Ec/Io values for each channel type received by a receiver finger at a time (t). As shown in block 302, the method includes obtaining per channel type bench weight values, for example, from stored bench weight table 208. As shown in block 304, the method includes determining current channel error values 123, (such as by the per channel type FER determinator 121) for channels of interest. The method also includes, as shown in block 306, determining the channel weight values (Wc) 216 on a per channel type basis based on the obtained bench weight value, channel energy values and current channel error values pursuant to Equation 1.

As shown in block 308, the method includes also determining receiver channel element factor values 218 based on the associated channel weight value, such as according to Equation 2. As shown in block 310, the control logic, when choosing a multi-path to receive controls the receiver channel element (fingers) to select channels with the highest channel weights 216 irrespective of pilot channel energy.

As shown in block 312, the method includes, when deassigning a receiver channel element (finger), dropping a receiver channel element that has the lowest receiver channel element factor value 218, irrespective of pilot channel energy. The process is continuously repeated to continually update and dynamically determine the channel weights (Wc) and the receiver channel element factor values to determine a suitable receiver channel element assignment/deassignment based on the finger factor value and/or the channel weight value.

Figure 4:
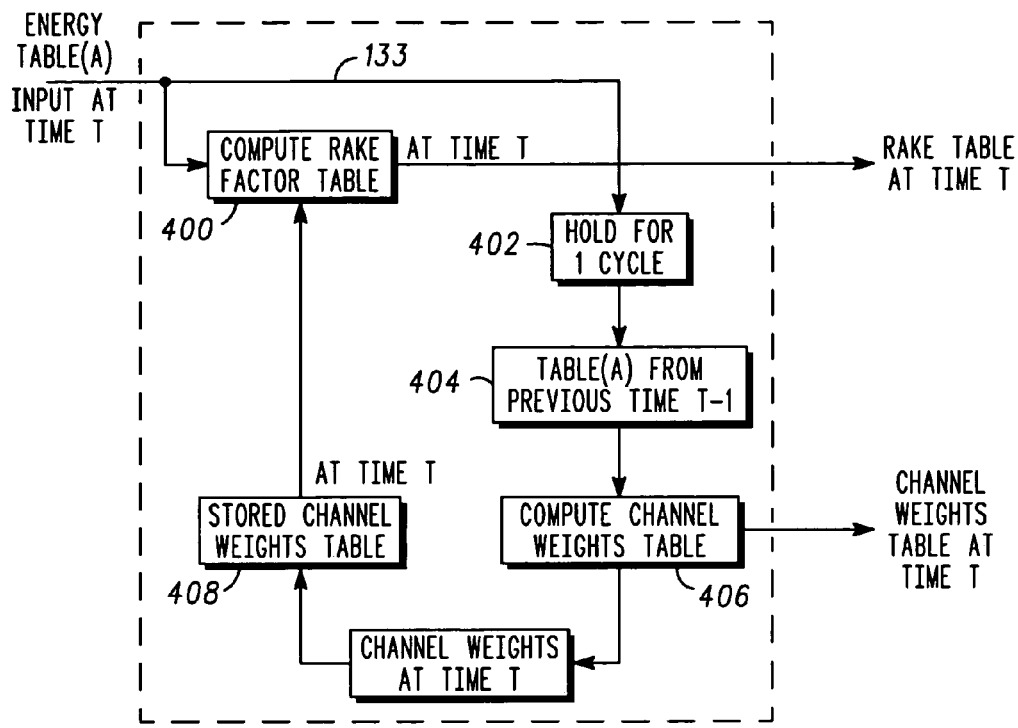
FIG. 4 is a diagram illustrating one example of a sequence of operations to generate receiver channel element factor tables and channel weight value tables in accordance with one embodiment of the invention.

FIG. 4 diagramatically illustrates another way of looking at the receiver channel element management module operation. As shown in block 400, the per channel-type energy table 133 is used to compute the receiver channel element factor table 214 at time t. The per channel type energy table 133 is held for one cycle (or more) as shown in block 402. As shown in block 404, the content of the table 133 then becomes the energy table from previous time t−1 which is then used to compute the channel weight table 212, as shown in block 406. Hence the channel weights are based on previously obtained channel energies. The computed channel weights are then stored, as shown in block 408, and used to compute the receiver channel element factor values which is shown in block 410.

The channel weights (Wc) serve as a metric denoting the importance of a channel in terms of its energy needs. The higher the need of energy, the higher the channel weight value (Wc). The channel weight value (Wc) automatically reduces when its energy needs are met. Accordingly, when adding fingers whose outputs are to be combined as multi-path information, the receiver channel element management module 109 does not add more fingers to a channel that is already strong enough and rather assigns the fingers judiciously for weaker channels. A channel with a low channel weight indicates that it is strong enough. When a finger is ready for assignment it is always assigned to the channel with the highest channel weight. As shown in Equation 1, the base value is introduced to prevent the channel weight value from going out of bounds in cases of low channel energy. The bench weight is a benchmark defined for each channel and represents the default weight factor when the channel is initiated. For example, when a channel is just initiated, the FER is equal to the energy which is equal to zero, so that the channel weight value equals the bench weight divided by the base energy bias.

The channel error value is augmented by a scale value. This values should be computed relative to the scales of related components of the system and maybe computed during implementation and moderates the channel weight. High channel error values reduce the channel weight. The channel error value is updated at the frame rate and is directly obtained from the frame error rate of that channel. The FER itself may be used and is obtained on a per channel basis from the decoder, as known in the art.

The finger receiver channel element factor value defines worth of the receiver channel element, in terms of its contribution to needy channels and is the output as provided in the receiver channel element factor table. The factor value does not depend upon the pilot energy raked by a finger but is a weighted average of its contribution to individual channels. This can be seen from Equation 2. For example, the RAKE factor for a given finger increases if the receiver channel element has good energy per channel for channels with high channel weights. Accordingly, such a finger should be preferred over fingers with lower weight factors even if they have the same higher pilot energies. On every update, the receiver channel element management module deposits a list of RAKE factor tables to the control logic. The RAKE factor is used when dropping fingers to discriminate between fingers on the grounds of their importance to needy channels rather than individual pilot energies.

Said in another way, the bench weight provides a type of priority-based value for each channel type. If the bench weight, for example, is set to zero then a particular mobile unit may not be using data channels so there may be no need for the receiver channel element finger assignment as disclosed herein. In addition, in the bursty CDMA 200 type systems, the power fluctuations created between a mobile unit and one or more serving base stations can greatly change the traffic channel energy. Accordingly, if the finger is based only on the pilot energy, this may be an inaccurate measurement of traffic channel power. To improve CDMA receiver performance, the disclosed receiver and method computes channel weight values. As a frame error rate increases, the channel weight decreases or its multi-paths are combined so the energy increases the channel type weight is lower. If the channel weight is high, the disclosed receiver and method assigns more fingers to that channel to obtain more multi-paths for a given channel. A channel may demand more fingers to get a higher signal because more energy is needed. Accordingly, pilot energies are not used in subsequent finger assignments other than the initial finger assignments, if necessary. The receiver channel element factor value helps determine which fingers to drop. If a finger is receiving a strong signal it may be desirable to assign the finger to another channel, otherwise the received strong signal can become interpreted as noise since in CDMA systems multiple users may use the same channel. The above apparatus and methods can drop the finger that is providing energy to healthy channels because this finger is redundant and can be rather used for more needy channels.

The finger with the lowest RAKE factor is dropped.

The scale value, the bench weight and the base value are stored in a programmable register, but may also be provided in any other suitable way. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for controlling a plurality of receiver channel elements in a CDMA receiver, each receiver channel element configured to receive a plurality of different channel, comprising the steps of:

determining a channel weight value on a per channel type basis, representing an extent of energy demanded by a channel, based on at least a bench weight value and a current channel error value;

determining a suitable receiver channel element assignment based on the channel weight value;

determining a finger factor value, representing a performance valuation metric for a receiver channel element, based on the channel weight value;

determining a suitable receiver channel element deassignment based on the finger factor value; and wherein the channel weight value is determined at least in part on the following formula:

$$W_C = \frac{(\text{Bench\_wt}) - (\text{current\_channel\_error\_value})}{\text{Base\_value} + \sum_{\text{all\_fingers}} \text{energy\_from\_allchannelsfor\_given\_channel\_type}}$$

where Base_value is a redefined scaling value.

2. The method of claim 1 wherein the step of determining a suitable receiver channel element deassignment includes de-assigning a receiver channel element based on the finger factor value by dropping a receiver channel element having a lowest finger factor value.

3. The method of claim 2 further includes the step of assigning a receiver channel element having a highest channel weight value to receive a multipath signal.

4. The method of claim 1 wherein the step of determining the finger factor value is determined based at least in part on the following formula:

$$\text{Fingerfactor\_value} = \frac{\sum_{\text{all\_channels}} (\text{energy\_to\_one\_channel})(\text{thatchannel\_Wc})}{\sum_{\text{all\_channels}} W_C}.$$

5. The method of claim 1 including the step of generating a channel weight table containing the channel weight value for each of the plurality of channels.

6. A method for controlling a plurality of receiver channel elements in a CDMA receiver, each receiver channel element configured to receive a plurality of different channels, comprising the steps of:

determining a channel weight value on a per channel basis, representing an extent of energy demanded by a channel, based on at least a bench weight value and a current channel error value;

determining a suitable receiver channel element assignment based on the channel weight value;

determining a finger factor value, representing a performance valuation metric for a receiver channel element, based on the channel weight value;

determining a suitable receiver channel element deassignment based on the finger factor value;

generating a channel weight table containing the channel weight value for each of the plurality of channels;

generating and storing a receiver channel element factor table containing a receiver channel element factor value for each of the plurality of receiver channel elements, and de-assigning at least one of the plurality of receiver channel elements based on the receiver channel element factor value by dropping a receiver channel element having a lowest finger factor value in the receiver channel element factor table.

7. A method for controlling a plurality of receiver channel elements in a CDMA receiver, each receiver channel element configured to receive a plurality of channels, comprising the steps of:

determining a channel weight value (Wc) on a per channel type basis, representing an extent of energy demanded by a channel, based on at least a bench weight value and a current channel error value such that:

$$W_C = \frac{(\text{Bench\_wt}) - (\text{current\_channel\_error\_value})}{\text{Base\_value} + \sum_{\text{all\_fingers}} \text{energy\_from\_allchannelsfor\_given\_channel\_type}}$$

where Base_value is a scaling factor;

determining a finger factor value, representing a performance valuation metric for a receiver channel element, based on the channel weight value, such that:

$$\text{Fingerfactor\_value} = \frac{\sum_{\text{all\_channels}} (\text{energy\_to\_one\_channel})(\text{thatchannel\_Wc})}{\sum_{\text{all\_channels}} W_C};$$

and determining a suitable receiver channel element de-assignment based on the finger factor value by assigning a receiver channel element having a highest channel weight value to receive a multipath signal and de-assigning a receiver channel element based on the finger factor value by dropping a receiver channel element having a lowest finger factor value.

8. The method of claim 7 including the step of generating a channel weight table containing the channel weight value for each of the plurality of channels.

9. The method of claim 7 including the steps of:

generating and storing a receiver channel element factor table containing a receiver channel element factor value for each of the plurality of receiver channel elements, and de-assigning at least one of the plurality of receiver channel elements based on the receiver channel element factor value by dropping a receiver channel element having a lowest finger factor value in the receiver channel element factor table.

10. A wireless receiver having a plurality of receiver channel elements operative to receive spread spectrum signals, at least two of the plurality of receiver channel elements assigned to a received signal of the spread spectrum signals and wherein the spread spectrum signal comprises a channel of a plurality of different channels, comprising:
- a receiver channel element management module, operatively coupled to the at least two of the plurality of receiver channel elements and operative to determine a suitable receiver channel element de-assignment based on a finger factor value, including:
  - a channel weight value determinator operative to determine a channel weight value on a per channel basis, representing an extent of energy demanded by a channel, based on at least a bench weight value and a current channel error value;
  - a finger factor value determinator operative to determine the finger factor value, based on the channel weight value, representing a performance valuation metric for a receiver channel element, based on the channel weight value; and
  - wherein the channel weight value determinator determines the channel weight value based at least in part on the following formula:

$$Wc = \frac{(\text{Bench\_wt}) - (\text{current\_channel\_error\_value})}{\text{Base\_value} + \sum_{\text{all\_fingers}} \text{energy\_from\_allchannelsfor\_given\_channel\_type}}$$

where Base_value is a predefined scaling value.

11. The wireless receiver of claim 10 wherein the finger factor value determinator determines the finger factor value at least in part based on the following formula:

$$\text{Fingerfactor\_value} = \frac{\sum_{\text{all\_channels}} (\text{energy\_to\_one\_channel})(\text{thatchannel\_Wc})}{\sum_{\text{all\_channels}} Wc}.$$

12. The wireless receiver of claim 10 wherein the receiver channel element management module de-assigns a receiver channel element based on the finger factor value by dropping a receiver channel element having a lowest finger factor value.

13. The wireless receiver of claim 12 wherein the receiver channel element management module assigns a receiver channel element having a highest channel weight value to receive a multipath signal.

14. The wireless receiver of claim 13 wherein the wireless receiver is in a mobile communication unit.

15. A wireless receiver having a plurality of receiver channel elements operative to receive spread spectrum signals, at least two of the plurality of receiver channel elements assigned to a received signal of the spread spectrum signals and wherein the spread spectrum signal comprises a channel of plurality of different channels, comprising:
- a receiver channel element management module, operatively coupled to the at least two of the plurality of receiver channel elements and operative to determine a suitable receiver channel element de-assignment based on a finger factor value, including:
  - a channel weight value determinator operative to determine a channel weight value on a per channel type basis, representing an extent of energy demanded by a channel, based on at least a bench weight value and a current channel error value;
  - a finger factor value determinator operative to determine the finger factor value, based on the channel weight value, representing a performance valuation metric for a receiver channel element, based on the channel weight value; and
- memory, operatively coupled to the receiver channel element management module, containing a channel weight table containing the channel weight value for each of the plurality of channel types and a receiver channel element factor table containing a receiver channel element factor value for each of the plurality of receiver channel elements.

* * * * *